United States Patent [19]

Date

[11] Patent Number: 4,779,882

[45] Date of Patent: * Oct. 25, 1988

[54] SEE SAW EXERCISE VEHICLE

[76] Inventor: Shonan Date, 6 Edgemont Cir., Scarsdale, N.Y. 10583

[*] Notice: The portion of the term of this patent subsequent to May 12, 2004 has been disclaimed.

[21] Appl. No.: 13,188

[22] Filed: Feb. 9, 1987

Related U.S. Application Data

[63] Continuation-in-part of Ser. No. 807,331, Dec. 10, 1985, Pat. No. 4,664,400.

[51] Int. Cl.⁴ .................. B62M 1/20; B62M 1/04
[52] U.S. Cl. .................... 280/230; 74/594.6; 272/73; 280/226 R
[58] Field of Search ............. 280/230, 226 R, 252, 280/253; 74/594.6; 272/73

[56] References Cited

U.S. PATENT DOCUMENTS 4,664,400 5/1987 Date ........................ 280/230

FOREIGN PATENT DOCUMENTS 521650 3/1921 France ...................... 280/253
780256 1/1935 France ...................... 280/253
330985 10/1935 Italy ........................ 280/253
2120185 11/1983 United Kingdom ......... 280/252

Primary Examiner—John J. Love
Assistant Examiner—Mitchell J. Hill

[57] ABSTRACT

A recreational and exercise cycle characterized by a propulsion system which derives its transmission force from the coordinated rowing action of the occupant's body weight, arm force, and foot-leg action comprising rotatable cranks, treadle and seat levers connected to and cranks, and a handle bar-power lever combination connected to a seat.

5 Claims, 5 Drawing Sheets

SEE SAW EXERCISE VEHICLE

This application is a continuation-in-part of application Ser. No. 807,331, filed 12/10/85, now U.S. Pat. No. 4,664,400, issued 5/12/87.

BACKGROUND OF THE INVENTION

The present invention pertains to new and useful improvements in velocipedes, and may be embodied in two-wheeled or three-wheeled exercise or recreational cycles propelled by the rider's muscular forces.

More particularly, the cycle or vehicle is drivable by means of pitman rods acting upon a crank by the coordinated action of the occupant's body weight, arm force and footleg action.

The novel two or three-wheeled vehicle is operated by the occupant-rider in a manner similar to the action of rowing a boat. This is highly desirable, because it is well known that the exercise by a human being when rowing a boat is a complete exercise in which most of the principle muscles of the body make a concerted effort and are thereby substantially fully exercised.

SUMMARY OF THE INVENTION

It is an object of the invention to provide a cycle construction to bring into action all of the muscles of the rider's body, and focus them in the propulsion of the vehicle.

Another object of the invention is to assemble the parts of the vehicle so that one set of the rider's muscles are rested while another set reciprocally performs the work of propelling the vehicle, and vice versa.

A still further object is to devise a construction whereby the cycle will accommodate itself to different positions assumed by the rider, to insure comfort.

Toward these ends, the invention contemplates providing exercise for the rider's hands, arms, back, legs, and upper body, while utilizing the extension and contraction actions of these organs to propel the vehicle forward.

In particular, the invention relates to a cycle of the velocipede type having as a system or propulsion, the reciprocating motion of the rider's hands, arms, legs and body in place of the system operated by the feet and legs used in the 360 degree cycling or pedalling process for propelling a vehicle forward.

The novel vehicle and system of propulsion of the present invention is based firstly upon the coordinated simultaneous extension action of both legs in combination with body-weight depression of the seat, while pulling the handle bar towards the body. The first coordinated action of body weight, arm pull and leg extension acts to push a lever connected to a lengthy crank rotatably connected to the rear wheel.

Propulsion of the present invention is based secondly upon the coordinated simultaneous standing action of both legs in combination with removing the body-weight from the seat, while pushing the handle bar forward away from the body, thereby allowing the seat to ascend to its original height. This second coordinated action operates to pull a lever connected to the short crank rotatably connected to the rear wheel.

The novel features of the invention consists of the construction and combination of parts hereinafter set forth and described.

DETAILED DESCRIPTION OF THE PREFERRED EMBODIMENT

Figure 1:
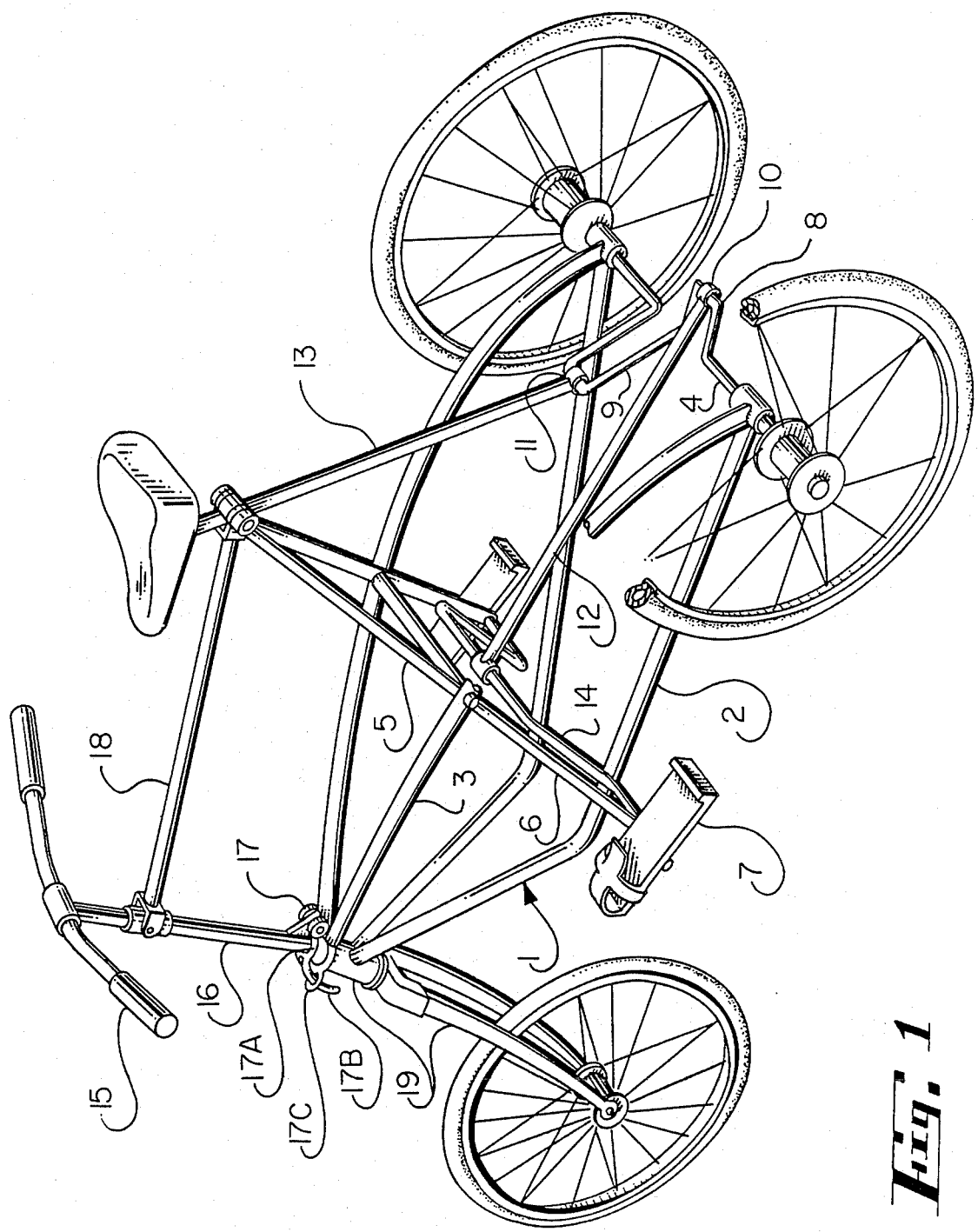
FIG. 1 is a side perspective view of the vehicle in partial cut away, showing the structure and arrangement.
Figure 2:
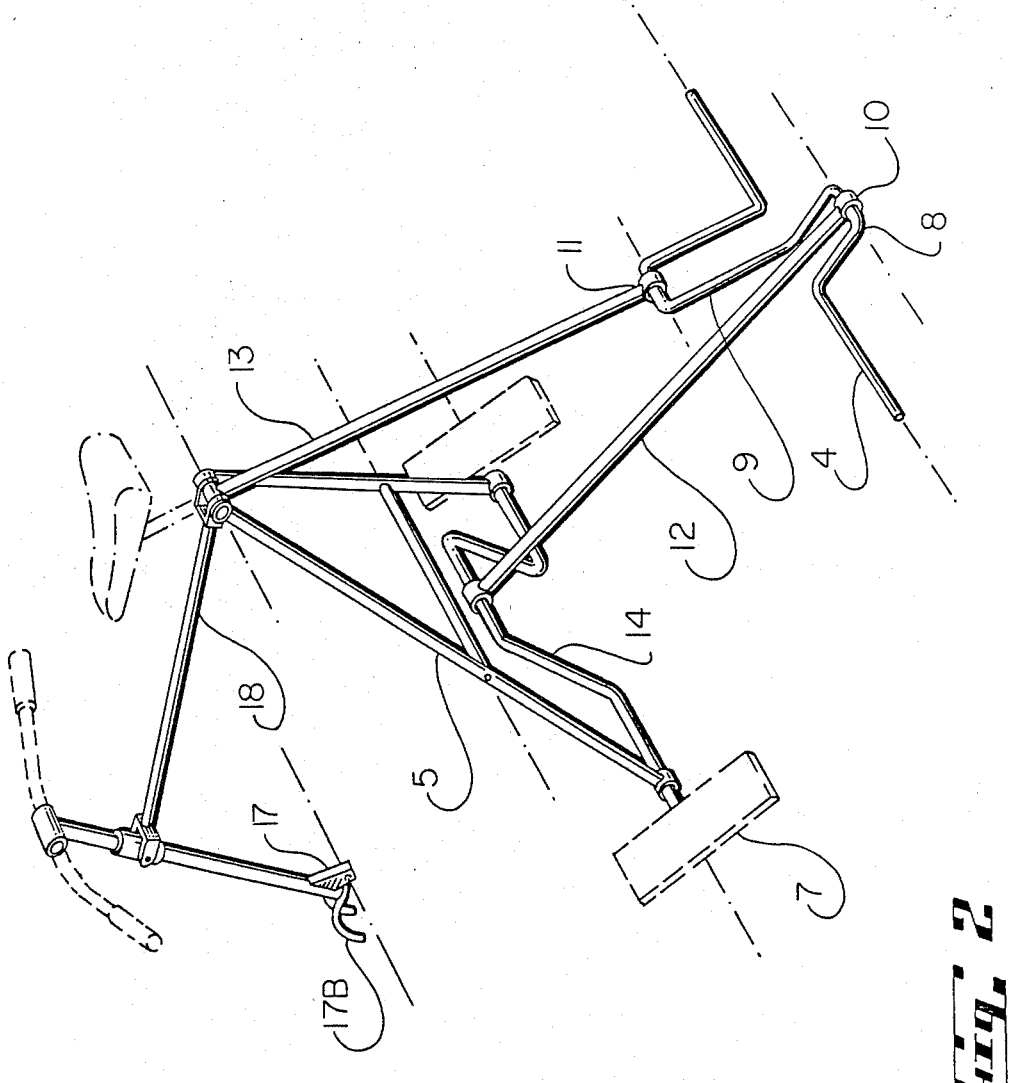
FIG. 2 is a side perspective view showing the points around which the parts of the vehicle pivot.

Referring now to FIG. 1 of the drawings, it is seen that the vehicle of the present invention comprises a frame indicated in general at 1, having a lower frame portion 2 which extends rearwardly in forked mounting relationship with rear wheel axle 4 of cranks 8 and 9, and upper frame portion 3 which extends in a rotatably connected manner to the A frame-mounting column 5, having downwardly projecting forked arms 6, through which treadle-shaft crank means extend, and onto which treadles 7 are solidly or non-rotatably attached.

In order for the occupant to combine the power derived from his weight with that from his muscular forces, connecting-rods or pitman 10 and 11 attach treadle-lever 12 and seat-mounting column lever 13 respectively to short crank 8 and long crank 9.

Main shaft or axle 4 rotates in harmonious accord due to the movement of the treadle-shaft crank 14, which is connected to treadle-lever 12 by a pitman, and the combined handle bar-seat movement through their connection with the seat-mounting column lever 13. The angles through which the ascent and descent of the seat-mounting column swings does not always align or cause synchronizing of the push on the long crank from the seat descent with the pull on the short crank from the treadle extension. Such deviation in the lack of alignment or synchronization is compensated for by treadle-shaft crank 14, which is flexibly rotatably attached to downwardly projecting forked arms 6, of the A frame-mounting column 5, in order to allow smooth continuous revolution of the wheels and prevent gaps or "jam-ups" in the operation of the vehicle.

The angular range between the short crank 8 and long crank 9, measured longitudinally from crankshaft 4, must be from about 135° to about 155° and the ratio of the length of the long crank to the length of the short crank must be from about 1.5:1 to about 2:1.

With these angles and ratios, the novel recreation-exercise vehicle of the invention can be made to accomodate the ratio of leg to body and arm lengths of most occupants, and also prevent a jam-up of harmonious flowing action between the first coordinated simultaneous extension action of both legs in combination with body-weight depression of the seat, while pulling the handle bar towards the body; and the second coordinated simultaneous standing action of both legs in combination with removal of the body-weight from the seat, while pushing the handle bar forward away from the body.

Figure 4:
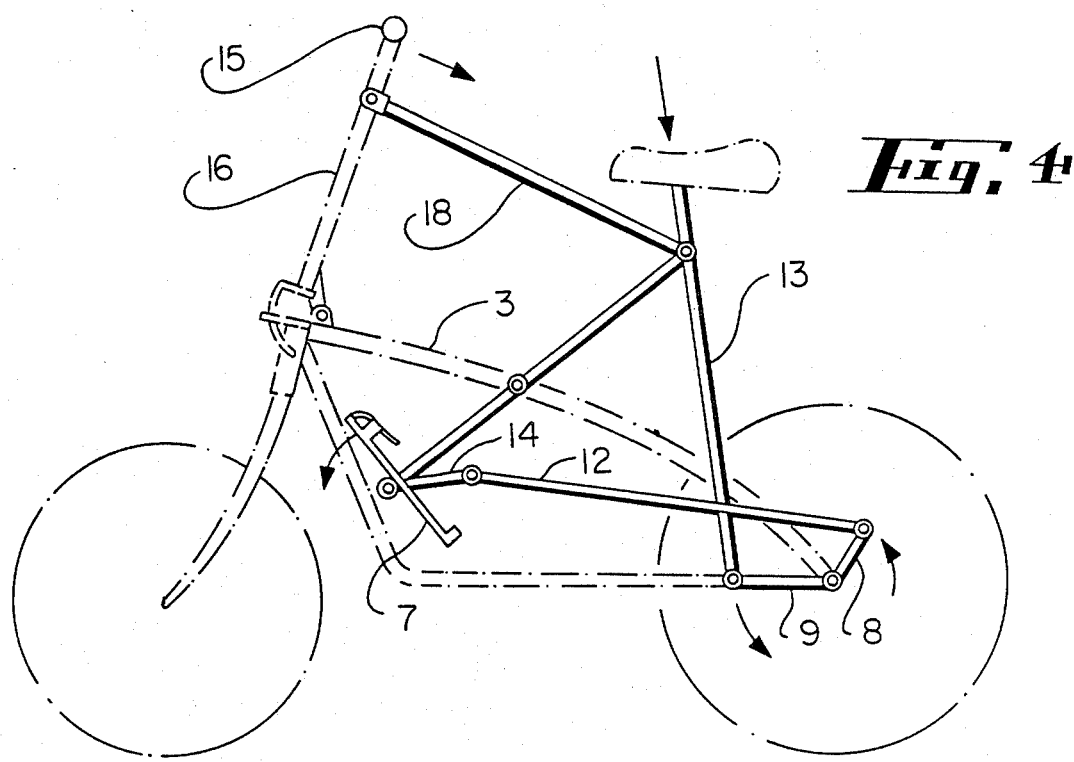
FIG. 4 is a side elevational view showing the seat, handle bar, and foot-treadle at points after commencing the coordicated action of sitting, pulling the handle bar, and extending the legs.
Figure 5:
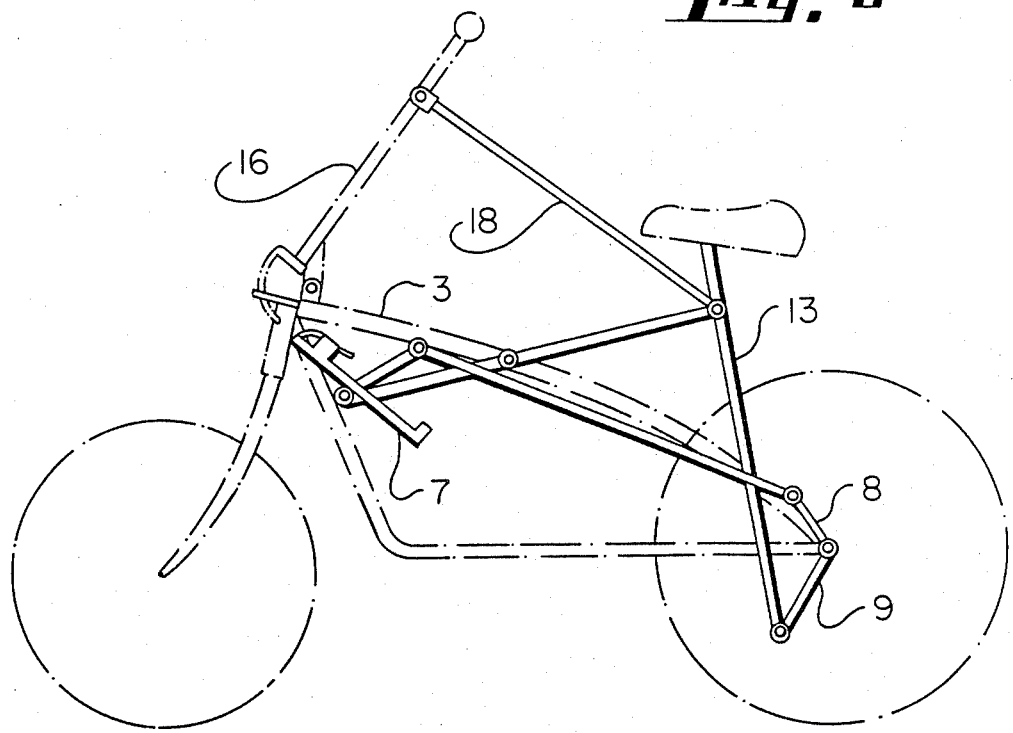
FIG. 5 is a side elevational view showing the seat fully depressed, the handle bar pulled in the utmost position towards the body, and the foot-treadles extended in the utmost position towards the front wheel of the vehicle.

Handle bar 15, is connected to a power lever indicated in general at 16, which is mounted in hinged assemblage 17 through a curved fork direction controlling means on the upper member 19A constituted by the front fork 19. This connection allows the dual functions of steering the vehicle and transmitting the arm-pulling force through longitudinal cross bar 18 in combination with depression of the seat to provide part of the force needed to push seat-mounting lever 13, which is connected through pitman rod 11 to long crank 9, as shown in FIGS. 4 and 5.

Hinged assembly 17 is raised in fixed relationship to the base of the power lever 16 at a point closely above the generally circular upper washer portion 17A, which is in fixed relationship to the base of power lever 16.

Upper washer portion 17A is integral to curved fork direction controlling means 17B, in that it extends from the generally circular periphery of the washer. The curved fork direction controlling means is projected at all times through the looped extensions 17C from the lower washer, which is in fixed relationship to the upper-most part of the member constituted by front fork 19.

Figure 3:
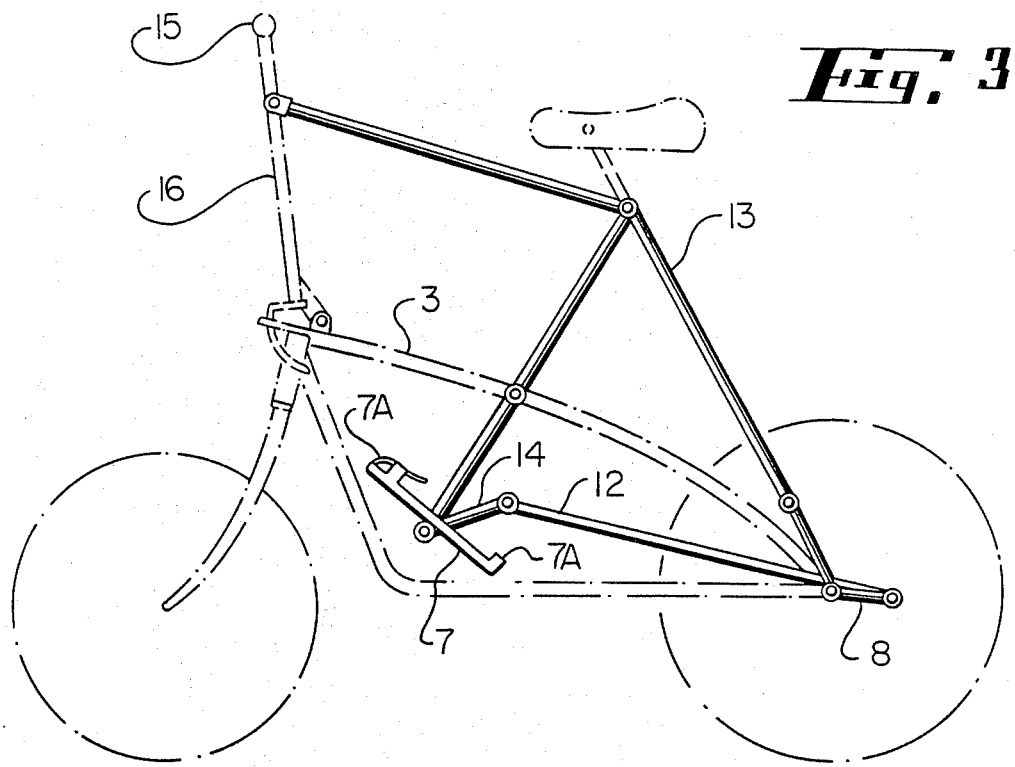
FIG. 3 is a side elevational view showing the seat at its highest elevation, the handle bar in the forward-most position, and the foot-treadle in the lowest position to accomodate a standing occupant.

As shown in FIG. 3, when treadles 7, which can be rotatably connected with ball-bearing journals, are in the position to accomodate a standing occupant, and the arm-pushing force has handle bar 15 in the forward-most position, the seat is at its highest elevation and short crank 8 is in the static position after having received the pulling force from treadle-lever 12. Strap or other foot securing means 7A are positioned on the treadle to prevent foot slippage in the standing position. In this position, the upper washer portion 17A is in full contact with lower washer portion 17C, and the curved fork direction controlling means 17B is fully extended through the looped extensions 17C on the lower washer.

After commencing the coordinated action of sitting, pulling the handle bar, and extending the legs, as shown in FIG. 4, the seat beings its descent, thereby giving a pushing action to long crank 9 through seat-mounting column lever 13, and positions short crank 8 for the forthcoming pulling action from treadle lever 12 upon further extension of the occupant's legs and more pulling force exerted on handle bar 15.

In FIG. 5, the front portion of the vehicle seat is shown very close to, but not in actual contact with the longitudinal cross bar 18 connecting power lever 16 and the upper portion of seat-mounting column lever 13.

Figure 6:
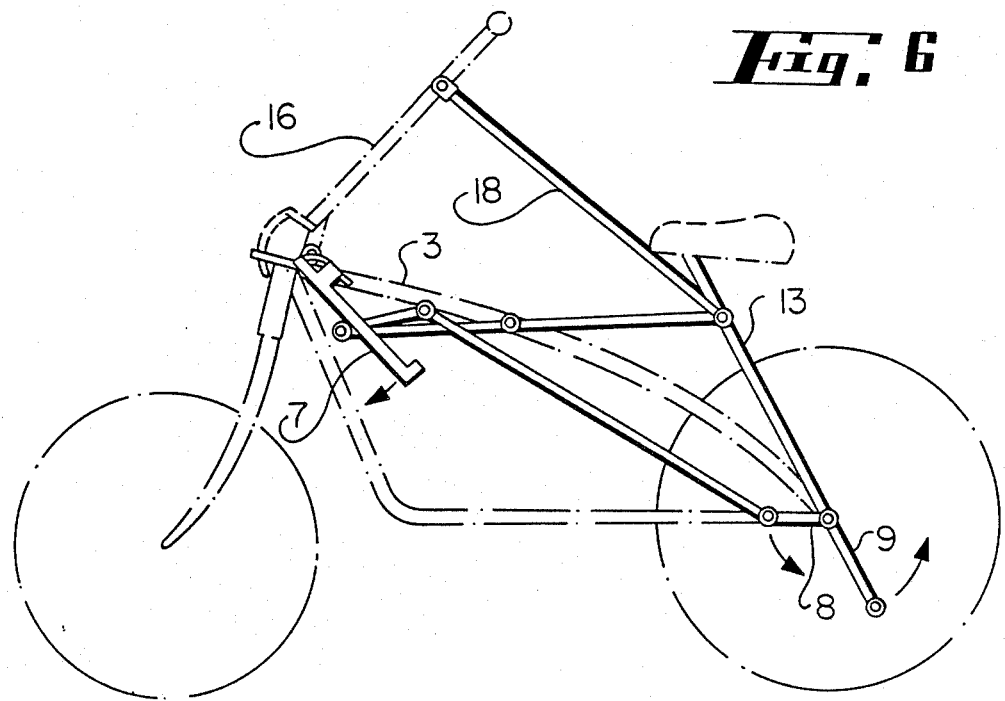
FIG. 6 is a side elevational view showing the positions of the seat, handle bar, and foot-treadles after commencing the coordinated action of pushing the handle bar forward to begin assumption of the standing position, and allowing the seat to ascend towards its highest elevation.

FIG. 6 shows the positions of the seat, handle bar, and foot treadles at points after full extension of the rider's legs, and at a point immediately prior to beginning resumption of seat ascent. In these positions, the pushing action on the long crank is about completely spent.

Figure 7:
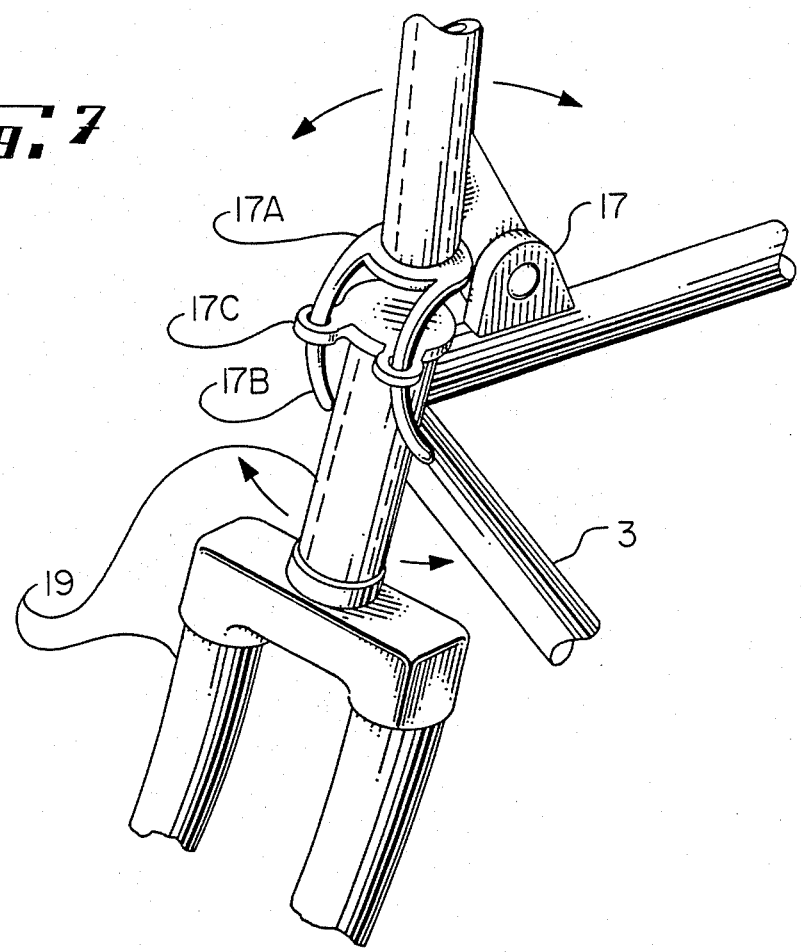
FIG. 7 is an enlarged view of the curved fork direction controlling means at the power-lever-handle bar base.

FIG. 7 shows an enlarged view of the raised hinged assembly portion and the curved fork direction controlling means of the steering mechanism, which allows steering of the vehicle from whichever position the power lever-handle bar is situated.

Figure 8:
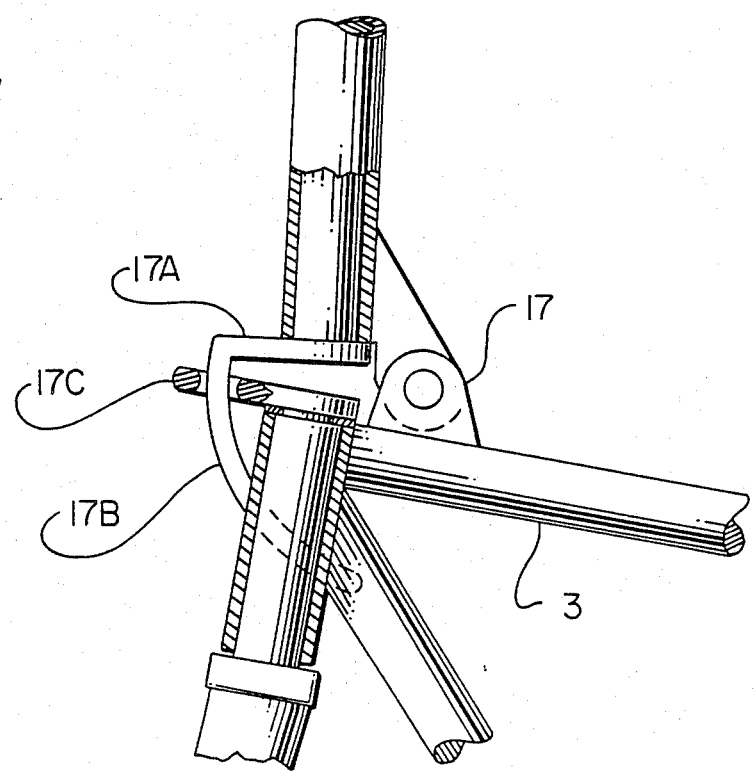
FIG. 8 is an enlarged view of the raised hinged assembly means connecting the upper vehicle frame portion and the base area of the power lever.

FIG. 8 shows an enlarged view of the raised hinged assembly connecting means and the position of the curved fork direction controlling means through the looped extensions of the lower washer.

While the invention has been described with reference to a tricycle suitable for use in a manner similar to the action of rowing a boat, a bicycle made in accordance with the invention is also operable by mounting a single rear wheel on the axle which extends from the short and long cranks, where the angle between the cranks and the ratio of length of the cranks are observed, together with the basic structural connections of the invention.

What is claimed is:

1. A recreational and exercise vehicle in the form of a cycle, characterized by a propulsion system which derives its transmission force from the coordinated rowing action of the occupant's body weight, arm force, and foot-leg action, comprising:
    rotatable crank means of long and short lengths as part of a common crankshaft;
    lever means connecting the short length crank to treadle-shaft crank means;
    foot treadle means solidly connected to the treadle-shaft crank means;
    lever means connecting the long length crank to an A frame-mounting column, which allows the seat to move up and down in arcuate manner; and
    a handle bar-power lever combination wherein the lower portion of a power lever is mounted in hinged assemblage with an upper member of a front fork through a curved fork direction controlling means extending downwardly through looped extensions attached to said upper member of said front fork; said handle bar-power lever and seat-mounting column lever means and side A frame-mounting column being connected by longitudinal cross-bar means.

2. The vehicle of claim 1, wherein the cycle is a tricycle.

3. The tricycle of claim 2, wherein the angular range between long and short length crank of said rotatable crank means is between at least about 135° to about 155° when measured longitudinally from the crankshaft.

4. The tricycle of claim 3, wherein the ratio of the length of the long crank to that of the short carnk is at least between about 1.5:1 to about 2:1.

5. The tricycle of claim 4, wherein the treadle has means to prevent the occupants feet from slipping in the standing position.

* * * * *